Aug. 17, 1943.  K. RÄNTSCH  2,326,970
ILLUMINATING SYSTEM, PARTICULARLY FOR PROJECTION PURPOSES
Filed July 1, 1940
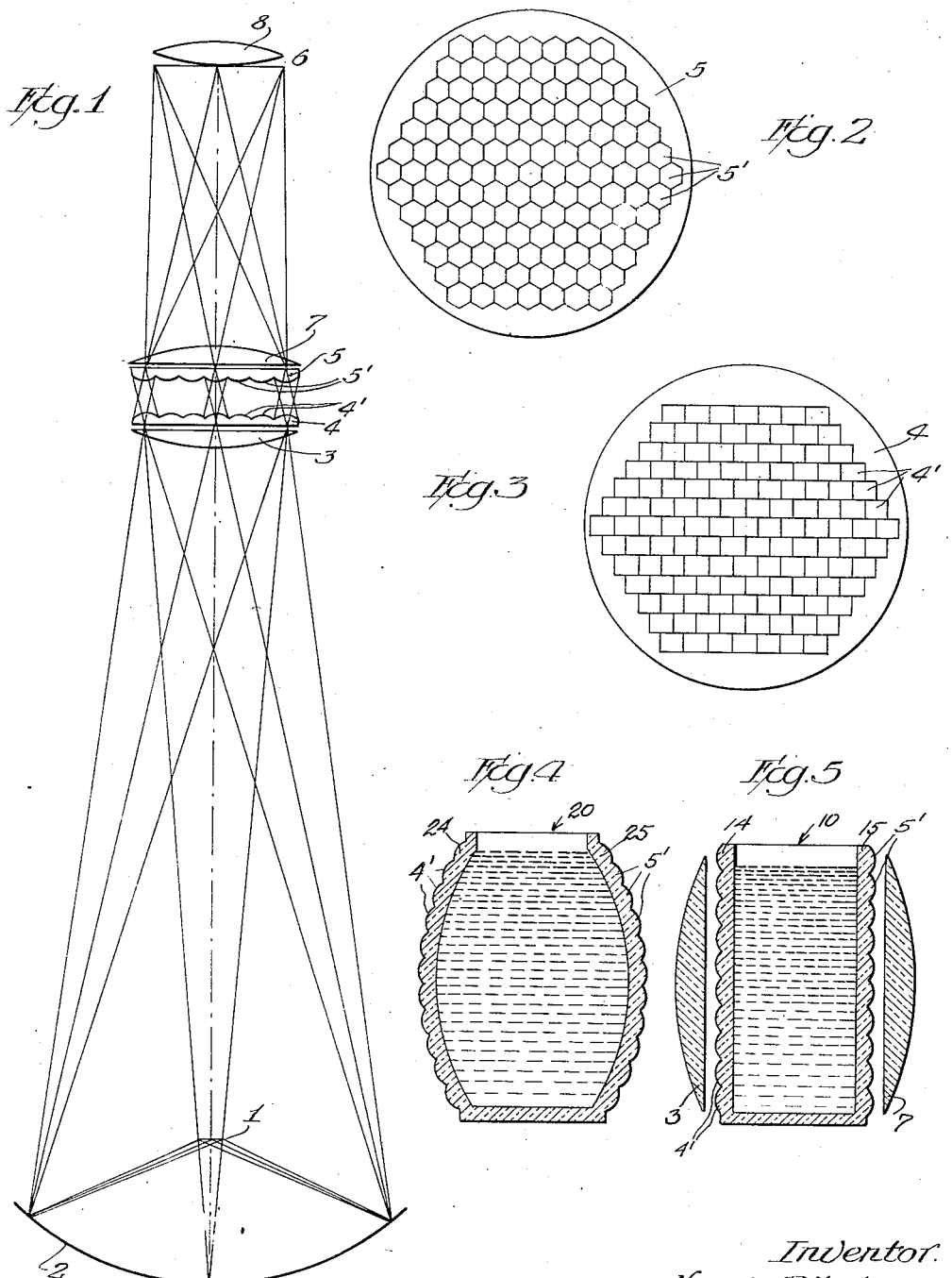
Inventor:
Kurt Räntsch Patented Aug. 17, 1943

2,326,970

UNITED STATES PATENT OFFICE 2,326,970

ILLUMINATING SYSTEM, PARTICULARLY FOR PROJECTION PURPOSES

Kurt Räntsch, Jena, Germany; vested in the Alien Property Custodian

Application July 1, 1940, Serial No. 343,419
In Germany May 25, 1939

4 Claims. (Cl. 88—24)

The invention relates to an illuminating system, particularly for projection purposes.

One of the objects of the invention is to effect a highly uniform illumination of the entire area of that window in which the picture to be projected appears.

In projecting devices in use at the present time for motion picture projection, the optical arrangement generally is such that a real image of the source of light or of the luminous area thereof is produced, as for instance by means of a reflector or by means of a condenser lens, within the plane of the window for the film picture to be projected. Where an arc lamp is used as source of light, a real image of the crater area of the positive electrode would be produced in the plane of the window for the film or picture. This condition leads to a number of disadvantages. One of the disadvantages is that the light within the crater area of the carbon of the arc lamp is not uniformly distributed and hence there is also a non-uniform distribution of illumination in the film plane, and obviously then also a non-uniform illumination of the picture on the projection screen. Furthermore, this condition makes it advisable or even necessary to make use of luminous areas, which by their very shape provide for the possibility of completely illuminating the entire area of the picture on the screen.

In the Patents No. 2,183,249 of December 12, 1939 and No. 2,186,123 of January 9, 1940, systems of illumination for projection purposes are described in which two lens screen plates are inserted into the normal path of the projecting light rays. In these known systems the two lens screens are of such construction and of such relation to each other that each individual lens of the screen closer to the source of light produces a real image of the luminous area in each of the individual lenses of the companion screen which is closer to the film window, and each individual lens of this companion screen produces a real image of an individual lens of the first screen in the plane of the film window itself, so that the picture of the film appearing in the window is illuminated by the light due to the real images of the lenses of the first screen.

These prior illuminating systems, therefore, were based upon the positioning of screens provided with numerous condenser lenses in the path of motion picture projection rays.

The present invention has the object of still further improving the prior system by producing a real image of the source of light by the reflector or the condenser or the like respectively, and extending the system through lens screens located in or near the plane of this image.

The lens screen closer to the light source is of such optical dimensions and at such distance from the companion lens screen, closer to the film window, that it produces in the plane of the companion lens screen a plurality of real reduced size images of the reflector, condenser or the like respectively. The companion lens screen, on the other hand, produces a plurality of real enlarged images of the lenses of the said first lens screen in the plane of the film window. Since the real image of the luminous area is subdivided by the first lens screen, owing to the close juxtaposition of the individual lenses of which it is built up, the companion lens screen projects these "subdivisions" into the plane of the film window, to illuminate thereby the (film) picture to be projected on the screen.

In order to utilize the intensity of the source of light to its utmost extent and highest efficiency, it is necessary to cause the images of these "subdivisions" projected by the companion lens to fully register with each other within the area of the window through which the film picture is to be projected.

The attainment of this maximum efficiency of projection may make it advisable to amplify the lens screen system by some additional optical system adapted to regulate the conicity of the beam of light. This additional optical equipment advisably is of such nature that it would produce a real image of the reflector image in the plane of the film window, if no lens screens were used at all.

By means of the present illuminating system, as described above, the real image of the source of light or of its luminous area is subdivided in the plane of the first lens screen by the lenses. Each individual section of the image lies in a separate lens, and the number of sections correspond to the number of lens elements on the lens screen. The sections forming in their entirety the complete image of the luminous area individually show fairly uniform distribution of the light each over its own sectional area even though the distribution of the light in general within the total area of the complete image of the source of light may not be uniform. By then projecting these several sections and by superimposing all of these image sections of the real image plane in the plane of the film window, there will be produced a sum total of the light from the individual sections each of which is already of fairly uniform intensity over the sectional area and the area in which the images are superimposed, is, therefore, illuminated to a far greater degree of uniformity than heretofore.

The particular advantage of this sectionalization or screening of the image of the luminous area and the registration of the images of the individual sections within the picture area to be illuminated is that primarily the main attention can be paid to the production of a light of maximum intensity for projection purposes. The uniformity of the light over the entire luminous area of the source of light becomes of secondary importance. Hence, it is feasible, for instance, to operate with a source of light which has a maximum intensity or light power in its central portion,—as in the case of arc lamps utilizing Beck electrodes. The high intensity of the light in the center of the source does not reduce the uniformity of illumination of the picture window even though the intensity of the light should sharply decrease from the center of the crater outward towards the marginal portion.

As soon as the necessity of making use of a source of light of a very uniform luminous area is eliminated, the expert will be able to utilize sources of light in which the total yield of light is greater or more advantageous.

Furthermore—owing to the interposition of a secondary lens screen system between the source of light and the plane of the picture window,— the necessity of selecting a luminous area of a shape similar to that of the window is eliminated.

Since the light due to the real image of the luminous area is sectionalized between the latter and the film window, it is for instance feasible to illuminate uniformly a rectangular picture window by projecting into its plane numerous images of rectangular sections even though the source of light may have a luminous area of diamond shape. This diamond shape of a luminous area is encountered for instance at the present time with certain high pressure mercury vapor lamps. Obviously it is only necessary to select lens screens which in their contour or general shape are in conformity with the contour or general shape of the real image of the luminous area.

An embodiment of the invention is diagrammatically illustrated in the accompanying drawing, to which reference is made in the following specification.

In the drawing:

Fig. 1 diagrammatically shows the optical arrangement of the system;

Fig. 2 is a diagrammatic front view of one lens screen, and

Fig. 3 shows diagrammatically the other lens screen, and

Figs. 4 and 5 illustrate each a modification of the lens screen arrangement of the invention, namely a water-cooled structure.

A source of light having the luminous area 1 is associated with a reflector 2 which produces a real image of said area 1 in a definite plane. In this plane a lens 3 is located. The real image of the area 1 is of such size that it may easily be subdivided into a larger number of fields or sections. This sectionalization of the real image is effected by a lens screen plate 4. The lens screen plate 4 is positioned with respect to the reflector 2 to produce real images of the reflector 2 in the plane of the second lens screen plate 5, one image in each lens thereof. This companion lens screen plate 5 again produces real images of the sectionalizing lenses of the lens screen plate 4 within the plane 6 of the picture window, and the size of these images in plane 6 approximately equals the size of this window, all of these last named images being in registration with each other within said window 6.

In order to utilize within the window 6 of the picture plane the beam of light emanating from the light concentrating means 2 over its entire area, the lens screen plate 4 must sectionalize this beam in such manner that the images of the individual lenses of this lens screen plate 4 correspond in shape to the shape of the area of window 6. If, for instance, this window is rectangular, the individual lens elements of the lens screen plate 4 also must be substantially rectangular to permit their images to "fill" this area of window 6.

Furthermore, in order to utilize in the most efficient way the real image of the reflector 2 produced in the individual lenses of the lens screen plate 5, these lenses must be shaped to correspond substantially to the shape of the reflector, and hence, should be approximately circular. It is essential that the images of the lenses of the lens screen 4 as produced by the lens screen plate 5 in the plane of window 6 should be in registration with each other within the area of the picture window. For this purpose the optical system comprising lens screens 4 and 5 is supplemented by an optical system comprising the lenses 3 and 7. This additional optical system may be dimensioned to produce an image of the reflector 2 in the plane of the picture window 6, as contrasted with the optical lens screen system 4, 5 which projects images of the lenses of screen 4 into the plane of window 6.

One of the requirements for bringing into registration the images resulting from coordination of lens screen plates is that the centers of the individual lenses in both of the lens screen plates are located similarly or in correspondence to each other. Another requirement, namely that for maximum utilization of the light is met by letting the various lenses on each screen directly abut each other without leaving any gaps between adjacent individual lens elements. Assuming the reflector 2 for the luminous area 1 to be circular, the lens screen plate 5 would have to meet these requirements. Its lenses should be of such shape that the image of the circular reflector (or luminous area) would fill the entire area of each lens. The lenses therefore should be circular. Furthermore, the individual lenses should abut each other over their entire contour. The two conditions are met as far as this is possible by making the lenses 5' hexagonal. Assuming then this lens screen plate 5 to be provided with a plurality of hexagonal lenses 5' abutting against each other without gaps, the "pattern" or arrangement of the centers of these lenses would thereby be fixed. Now, the "pattern" of the centers of the lenses 4' in the other lens screen plate must be the same or analogous. The lens screen plate 4, however, must be provided with lenses, the outline of which corresponds to the outline of the picture window 6. These lenses 4', therefore, would have to be rectangular. The rectangular lenses 4' on the lens screeen plate 4 hence must be disposed thereon in the manner illustrated in Fig. 3, so that the orientation of the centers of the rectangular lenses 4' relatively to each other would be the same as the orientation of the centers of the hexagonal lenses 5' in the lens screen plate 5. The application of hexagonal lenses 5' in mutual abutment on lens screen 5 calls for the arrangement of rectangular lenses 4' on lens screen 4 in horizontal lines and vertical rows with the lenses in alternate lines vertically aligned and laterally offset by the width of one half lens with respect to the lenses in adjacent lines.

It is obvious that this arrangement of lens screen plates is applicable to the system illustrated by way of example in the drawing. If the reflector 2 would be of non-circular shape, or if the picture window 6 would be of non-rectangular shape, the arrangement of the individual lenses, as shown in Figs. 2 and 3, also would have to be altered accordingly.

Additionally, for the purpose of improving the efficiency in the uniform illumination of the picture window 6 by the total flow of light, it is advisable to locate a lens 8 adjacent the plane of the picture window 6. This collector lens crowds the rays of light together to form a cone, and it is this cone of light which is passed through the projecting lens. Where the lens screen plates 4, 5 are of circular shape, as shown in Figs. 2 and 3, (and as they normally will be where the source of light is formed by a crater of an arc lamp of circular cross-section), the lens 8 associated with the picture window 6 must be a spherical lens. If, however, the luminous area should be of a different shape and if the lens screen plates are shaped in analogy to the luminous area, it is advisable to make use of lenses having astigmatic correction. In this manner the best possible distribution of the flow of light and the most favorable coordination of the rays of light within the projecting lens will be produced.

The lens screen plates 4 and 5 are in practice made of pressed glass. It is, however, feasible to combine each of these lens screen plates with the pertaining optical lenses 3 and 7, so that the compound parts 3, 4 and 5, 7, respectively form self-contained unitary compound condenser lens elements, each formed on one side by the lens screen plate and on the other side by a unitary spherical (or other) lens.

A further contraction can be made by forming the entire intermediary image producing system to form a self-contained single structure instead of being assembled of two structures, each having two parts. In that case the lenses of the lens screen would be applied directly upon the curved lens surfaces of the optical body thus formed.

Instead of constructing the optical body as a massive solid element, it is also feasible to construct it as a hollow body or tank for cooling,— in which case the lenticular surfaces each provided with a great number of individual screen lenses would constitute the opposite walls of this hollow body or tank.

Such a hollow body is illustrated in Fig. 4 in which the lens screens 4' and 5' are integrally formed with the convex walls 24 and 25 respectively, of the tank 20 filled with a cooling fluid, such as water. Fig. 5 illustrates a modification of this tank, namely a tank 10 provided with spaced plane walls 14 and 15 on the outer faces of which the lens screens 4' and 5' respectively, are arranged. In this last named embodiment the lenses 3 and 7 are required in similar manner as shown in Fig. 1.

I claim:

1. Illuminating system for projection, comprising in combination with a source of light, a picture window, optical means for creating a real image of said source of light in a plane between said source of light and said window, a pair of lens screens closely adjacent the plane of said real image and spaced along the optical axis of the system, each lens of the lens screen closer to the source of light being adapted to produce an image of said first named optical means in a reduced size in each of its corresponding lens on the companion screen, and each lens on the companion screen being adapted to produce an enlarged image of its corresponding lens of said first named screen in the plane of the picture window and within the area of said window, said last named images being in registration with each other and being of a size to fill out the entire area of said picture window, a tank suitable for cooling the medium through which the light passes between said source and said picture window, each lens screens forming an end wall of said cooling tank.

2. An illuminating system for projection, comprising a source of light, a picture window, optical means for producing a real image of said source of light in a plane between the source of light and the plane of the picture window, a pair of lens screens in the plane of said real image and closely adjacent thereto respectively, each lens on the lens screen closer to the source of light being adapted to produce a real image of said first named optical means in a reduced size in each corresponding lens of the companion screen and each lens on the companion screen being adapted to produce an enlarged image of its corresponding lens on the first named lens screen in the plane of the picture window, additional lenses, one associated with each lens screen, so that said last named images are projected in registration with each other in the plane of the picture window, said images being of a size to fill out the entire area of said picture window, and an optical lens adjacent the plane of the picture window and adapted to angularly regulate the course of the rays of light after passage through the picture window.

3. In a projection system having a source of light, a picture window, optical means for forming a real image of the light source between the light source and the picture window, and a pair of lens screens aligned on the optical axis of the projection system and located closely adjacent the image plane of said optical means for illuminating the area of the picture window from the real image formed by said optical means, the combination of a plurality of lenses carried by each lens screen and arranged in corresponding pairs in optical alignment with each other, the lenses of the screen nearest the light source each having a focal length and each being spaced from the light source and the companion lens screen to each project a real image of said optical means in a reduced size in a corresponding lens of the companion lens screen, and the lenses of the companion lens screen each having a focal length and each being spaced from the lens screen nearest the light source and the picture window to each project an enlarged real image of their corresponding lens carried by the lens screen nearest the light source into the plane of the picture window.

4. In an illuminating system for projection purposes having a light source, a picture window and optical means for producing a real image of the light source in a plane between the light source and the picture window, a pair of lens screens aligned on the optical axis of the system and located closely adjacent the image plane of said optical means for illuminating the area of the picture window from the real image formed by said optical means and other optical means for modifying the rays of light emanating from the lens screen which illuminates the picture window whereby said light rays are substantially confined within the area of the picture window in the plane of the latter, the combination of a plurality of lenses carried by each lens screen in such relation to the source of light, the picture window and to each other that each lens of the lens screen nearest the source of light produces an image of the source of light in a reduced size in its corresponding lens of the companion lens screen, and the companion lens screen produces images of enlarged sizes, one of each lens of the first named lens screen in the plane of the picture window, and a pair of positive lenses, one located on one side of said screens and the other located on the other side of said screens in a position to form an image of the first named optical means in the plane of the picture window.

KURT RÄNTSCH.